United States Patent
Feng et al.

(10) Patent No.: US 12,338,910 B2
(45) Date of Patent: Jun. 24, 2025

(54) ELECTROMAGNETIC VALVE AND ELECTROMAGNETIC VALVE ASSEMBLY

(71) Applicant: ZHEJIANG DUNAN ARTIFICIAL ENVIRONMENT CO., LTD., Shaoxing (CN)

(72) Inventors: Zhongbo Feng, Shaoxing (CN); Wenrong Zhang, Shaoxing (CN); Fugang Wang, Shaoxing (CN); Meiling Peng, Shaoxing (CN)

(73) Assignee: ZHEJIANG DUNAN ARTIFICIAL ENVIRONMENT CO., LTD., Shaoxing (CN)

(*) Notice: Subject to any disclaimer, the term of this patent is extended or adjusted under 35 U.S.C. 154(b) by 58 days.

(21) Appl. No.: 18/369,793

(22) Filed: Sep. 18, 2023

(65) Prior Publication Data
US 2024/0003460 A1  Jan. 4, 2024

Related U.S. Application Data (63) Continuation of application No. PCT/CN2022/074849, filed on Jan. 28, 2022.

(30) Foreign Application Priority Data

Mar. 23, 2021 (CN) .......................... 202120591592.4

(51) Int. Cl.
*F16K 31/06* (2006.01)
*F16K 27/02* (2006.01)
(Continued)

(52) U.S. Cl.
CPC ........ *F16K 31/0675* (2013.01); *F16K 27/029* (2013.01); *F16K 31/0655* (2013.01);
(Continued)

(58) Field of Classification Search
None
See application file for complete search history.

(56) References Cited

U.S. PATENT DOCUMENTS 3,665,960 A * 5/1972 Skinner, II .............. F16K 37/00
                                                              137/551
4,540,154 A * 9/1985 Kolchinsky ........... F16K 31/408
                                                              335/278
(Continued)

FOREIGN PATENT DOCUMENTS

CN   205938095 U  *  2/2017
CN   206708490 U     12/2017
(Continued)

OTHER PUBLICATIONS

First Notice of Reasons for Refusal of KR10-2023-7036042, Nov. 26, 2024.
(Continued)

*Primary Examiner* — Matthew W Jellett (57) ABSTRACT

An electromagnetic valve and an electromagnetic valve assembly are provided. The electromagnetic valve includes: a valve body, which at least includes a valve seat, the valve seat being mounted on a mounting base; a magnetic conductive frame, which is fixed to the valve seat; and an electromagnetic driving assembly, which is mounted in the magnetic conductive frame. The magnetic conductive frame is provided with a positioning member, and the positioning member cooperates with the mounting base so as to restrict the electromagnetic driving assembly from rotating relative to the mounting base.

20 Claims, 5 Drawing Sheets

(51) Int. Cl.
*F16K 31/40* (2006.01)
*H01F 7/126* (2006.01)

(52) U.S. Cl.
CPC .............. *H01F 7/126* (2013.01); *F16K 31/40* (2013.01); *F16K 31/408* (2013.01)

(56) References Cited

U.S. PATENT DOCUMENTS

| | | | | |
|---|---|---|---|---|
| 5,299,775 | A * | 4/1994 | Kolze | G05D 16/2095 251/38 |
| 5,925,826 | A | 7/1999 | Kodama et al. | |
| 6,029,703 | A * | 2/2000 | Erickson | F15B 13/0442 137/625.61 |
| 7,886,760 | B2 * | 2/2011 | Groschel | F16K 31/06 335/297 |
| 10,041,396 | B2 * | 8/2018 | Lenk | F16K 1/46 |
| 10,288,190 | B2 * | 5/2019 | Becker | F16K 27/029 |
| 2005/0189510 | A1 * | 9/2005 | Golovatai-Schmidt | F16K 31/0637 251/129.15 |
| 2009/0038690 | A1 * | 2/2009 | Zur | H01F 7/126 251/129.15 |
| 2021/0098168 | A1 * | 4/2021 | Heidemann | H01F 7/16 |

FOREIGN PATENT DOCUMENTS

| | | |
|---|---|---|
| CN | 206708508 U | 12/2017 |
| CN | 206943546 U | 1/2018 |
| CN | 110242784 A | 9/2019 |
| CN | 110792786 A | 2/2020 |
| CN | 111963695 A | 11/2020 |
| CN | 212718017 U | 3/2021 |
| JP | 2004100788 A | 4/2004 |
| KR | 102177298 B1 | 11/2020 |
| WO | WO2015037351 | 3/2015 |

OTHER PUBLICATIONS

International Search Report of PCT/CN2022/074849, Mar. 29, 2022.
Notice of Reasons for Refusal of JP2023550626, Aug. 2024.
European search report of EP22773915.8, Aug. 6, 2024.

* cited by examiner

ELECTROMAGNETIC VALVE AND
ELECTROMAGNETIC VALVE ASSEMBLY

CROSS-REFERENCE TO RELATED
APPLICATIONS

This application is a continuation of international patent application No. PCT/CN2022/074849, filed on Jan. 28, 2022, which itself claims priority to Chinese patent application No. 202120591592.4, filed on Mar. 23, 2021, titled "ELECTROMAGNETIC VALVE AND ELECTROMAGNETIC VALVE ASSEMBLY". The content of the above application is hereby incorporated by reference.

TECHNICAL FIELD

The present disclosure generally relates to the field of vehicle components, and in particular, to an electromagnetic valve and an electromagnetic valve assembly.

BACKGROUND

At present, an electromagnetic valve is commonly used in the field of vehicle components for opening and closing a flow path of an air conditioning system. The electromagnetic valve and corresponding components of the air conditioning system must be assembled as an integral structure. In an assembly process, the assembly of the electromagnetic valve is complex, and orientations of an electromagnetic driving assembly and a magnetic conductive frame in the electromagnetic valve are difficult to position, resulting in low efficiency of the assembly.

SUMMARY

For the issue of the above technical problem, an electromagnetic valve and an electromagnetic valve assembly are provided.

In order to achieve the above objective, the present application provides the following technical solutions:

An electromagnetic valve is mounted on a mounting base, and the electromagnetic valve includes a valve body, a magnetic conductive frame, and an electromagnetic driving assembly;
wherein the valve body at least includes a valve seat, and the valve seat is mounted on the mounting base;
the magnetic conductive frame is fixed to the valve seat;
the electromagnetic driving assembly is mounted in the magnetic conductive frame;
the magnetic conductive frame is provided with a positioning member, and the positioning member is capable of cooperating with the mounting base so as to restrict the electromagnetic driving assembly from rotating relative to the mounting base.

It could be understood that the positioning member is disposed on the magnetic conductive frame, during an assembly process, it may realize rapid positioning of orientations of the electromagnetic driving assembly and the magnetic conductive frame, rapidly realize fixation of the electromagnetic driving assembly, improve assembly efficiency, ensure stability of the electromagnetic valve in an applying process, and prevent the electromagnetic driving assembly from deviating in orientation and even shifting relative to the mounting base.

In an embodiment, the positioning member includes a pin of the magnetic conductive frame extending towards the mounting base.

In an embodiment, the pin is in a shape of a L.

In an embodiment, an end of the pin away from the magnetic conductive frame is bent to define as a bent portion, and the bent portion is provided with a first through hole. The electromagnetic valve further includes a connecting member, which penetrates through the first through hole and is connected to the mounting base.

It could be understood that by providing the bent portion and the first through hole, positioning of the orientations of the magnetic conductive frame and the electromagnetic driving assembly may be realized when the connecting member penetrates through the first through hole, and the assembly may be convenient and fast.

In an embodiment, the bent portion abuts against the mounting base.

It could be understood that when the magnetic conductive frame is assembled and mounted, the bent portion of the pin may just abut against the mounting base, and the bent portion and the mounting base may cooperate with each other to reduce difficulty of assembly. When the bent portion abuts against the mounting base, the mounting base may play a certain supportive role for the magnetic conductive frame, and the assembly may be more stable.

In an embodiment, the valve seat further includes a clamping portion, which is provided proximal to the magnetic conductive frame, and a part of the clamping portion protrudes from the mounting base along an axial direction of the valve seat; and the positioning member is provided at an end of the magnetic conductive frame proximal to the valve seat, and the part of the clamping portion protruding from the mounting base along the axial direction of the valve seat has the same height as the positioning member.

It could be understood that the clamping portion may be set to protrude from the mounting base, which facilitates forcing to a protruding part for mounting. In addition, the part of the clamping portion protruding from the mounting base has the same height as the positioning member, so that the positioning member is exactly in contact with the mounting base and is connected to the mounting base after the assembly is completed, which reduces a height of the electromagnetic valve and the mounting base after the assembly and decreases occupied space.

In an embodiment, the positioning member and the magnetic conductive frame are an integral construction.

It could be understood that the positioning member and the magnetic conductive frame are an integral construction, which reduces assembly steps and enables a connection between the positioning member and the magnetic conductive frame more stable.

In an embodiment, the electromagnetic valve further includes a blocking assembly, the valve seat is provided with a valve port, and the blocking assembly is disposed in the valve seat and is capable of opening and closing the valve port when the blocking assembly is driven by the electromagnetic driving assembly.

The present disclosure further provides an electromagnetic valve assembly, including a mounting base and any one of electromagnetic valves described above, and at least a part of the electromagnetic valve is mounted in the mounting base.

In an embodiment, the mounting base is provided with a mounting portion corresponding to the positioning member, and the positioning member cooperates with the mounting portion to limit rotation of the magnetic conductive frame.

It could be understood that the mounting base is provided with the mounting portion, and the positioning member may cooperate with the mounting portion to realize rapid connection during assembly, simplifying the assembly steps and improving the assembly efficiency.

Compared with the related art, the electromagnetic valve may realize rapid positioning of orientations of the electromagnetic driving assembly and the magnetic conductive frame during the assembly process by disposing the positioning member on the magnetic conductive frame, rapidly realize fixation of the electromagnetic driving assembly, improve the assembly efficiency, ensure stability of the electromagnetic valve in the applying process, and prevent the electromagnetic driving assembly from deviating in orientation and even shifting relative to the mounting base.

In the figures, 100 represents an electromagnetic valve, 1 represents a valve seat, 11 represents a first cavity, 12 represents a clamping portion, 121 represents a clamping plane, 13 represents a connecting portion, 131 represents a first threaded portion, 14 represents an inlet flow channel, 15 represents an outlet flow channel, 16 represents a valve port, 2 represents a magnetic conductive frame, 21 represents a positioning member, 22 represents a bent portion, 23 represents a first through hole, 24 represents a connecting member, 3 represents an electromagnetic driving assembly, 31 represents a sleeve, 32 represents an electromagnetic coil, 33 represents a stator, 34 represents an actuator, 341 represents a third cavity, 35 represents a valve needle, 36 represents a first elastic member, 37 represents an elastic member of a valve needle, 4 represents a valve cover, 5 represents a mounting base, 52 represents a mounting portion, 6 represents a blocking assembly, 61 represents a blocking body, 62 represents a second elastic member, 63 represents a pilot valve port, and 200 represents an electromagnetic valve assembly.

DETAILED DESCRIPTION OF THE EMBODIMENT

The technical solutions in the embodiments of the present disclosure are clearly and completely described in the following with reference to the accompanying drawings in the embodiments of the present disclosure. It is obvious that the described embodiments are only a part of the embodiments, but not all of the embodiments. All other embodiments obtained by those skilled in the art based on the embodiments of the present disclosure without making creative labor are the scope of the present disclosure.

It should be noted that when an assembly is considered to be "disposed on" another assembly, it can be directly disposed to another assembly, or there can be a centered assembly. When an assembly is considered to be "set on" another assembly, it can be directly set on another assembly, or there can be a centered assembly at the same time. When an assembly is considered to be "fixed to" another assembly, it can be directly fixed to another assembly, or there can be a centered assembly at the same time.

Unless otherwise defined, all technical and scientific terms used herein have the same meaning as a skilled person in the art would understand. The terminology used in the description of the present disclosure is for the purpose of describing particular embodiments and is not intended to limit the disclosure. The term "or/and" as used herein includes any and all combinations of one or more of the associated listed items.

Figure 1:
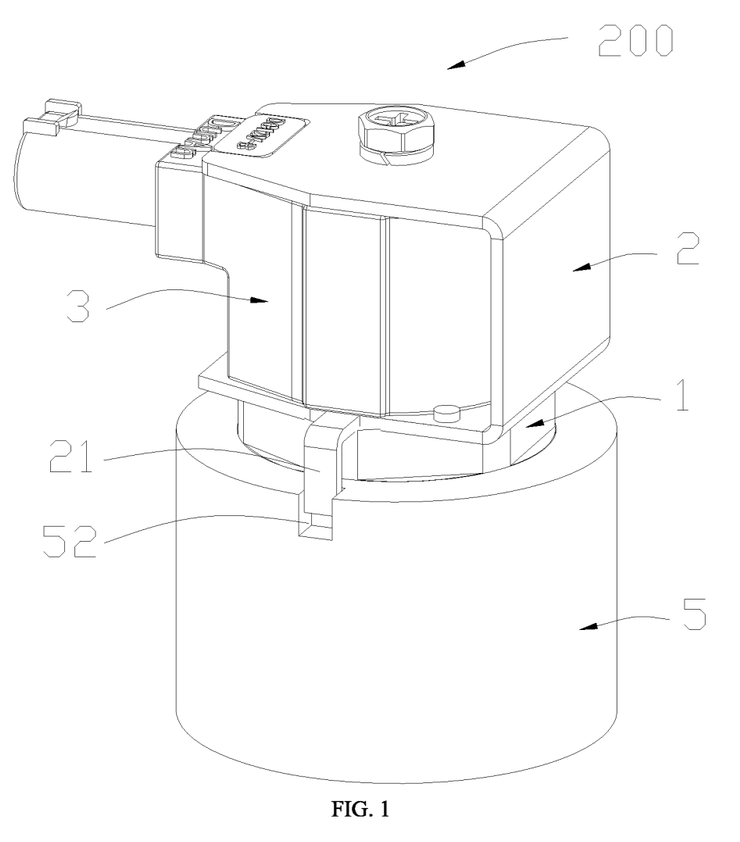
FIG. 1 is a schematic diagram of an assembly of an electromagnetic valve and a mounting base in an embodiment of the present disclosure.

Referring to FIG. 1, the present disclosure provides an electromagnetic valve 100, which is mounted on a mounting base 5. The electromagnetic valve 100 is configured to control on/off of medium or a magnitude of medium flow in a pipeline.

Specifically, the electromagnetic valve 100 includes a valve body, a magnetic conductive frame 2, and an electromagnetic driving assembly 3. The valve body at least includes a valve seat 1, the magnetic conductive frame 2 is fixed to the valve seat 1, and the electromagnetic driving assembly 3 is mounted in the magnetic conductive frame 2. The magnetic conductive frame 2 is provided with a positioning member 21, after the electromagnetic valve 100 is mounted on the mounting base 5, the positioning member 21 is capable of cooperating with the mounting base 5 so as to restrict the electromagnetic driving assembly 3 from rotating relative to the mounting base 5. Thus, it may rapidly realize fixation of the electromagnetic driving assembly 3 and improve overall assembly efficiency. Meanwhile, it may be prevented that the electromagnetic driving assembly 3 deviates in orientation in an applying process and even shifts relative to the mounting base 5, and it may ensure stability of the electromagnetic valve 100 in the applying process.

Figure 5:
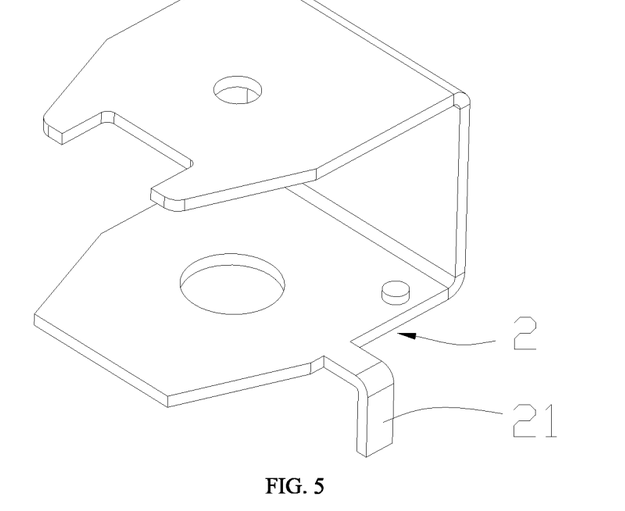
FIG. 5 is a schematic diagram of a magnetic conductive frame in an embodiment of the present disclosure.

In an embodiment, referring to FIG. 1 and FIG. 5, the positioning member 21 may include a pin of the magnetic conductive frame 2 extending towards the mounting base 5. During mounting, the orientation of the electromagnetic driving assembly 3 and the magnetic conductive frame 2 may be determined according to specific mounting requirements. By restricting the pin to the mounting base 5, orientations of the electromagnetic driving assembly 3 and the magnetic conductive frame 2 may be rapidly positioned and fixed to prevent the electromagnetic driving assembly 3 and the magnetic conductive frame 2 from rotating or deflecting relative to the mounting base 5. In this embodiment, a specific structure of the positioning member 21 may be not limited to the above description. For example, it may also be a protruding structure set on the magnetic conductive frame 2 or a snap structure that may cooperate with and be connected to the mounting base 5.

In an embodiment, referring to FIG. 1 and FIG. 5, the pin may be L shaped. An end of a L-shaped pin may be connected to the magnetic conductive frame 2, and another end may be connected to the mounting base 5 to realize the positioning of the orientation of the magnetic conductive frame 2. In other embodiments, a specific structural form of the pin is not limited to the shape of L, but may also be other shapes, such as a shape of C and the like.

Figure 6:
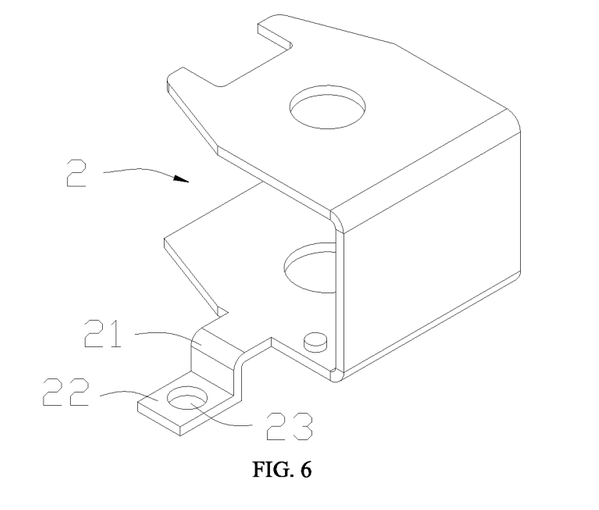
FIG. 6 is a schematic diagram of a magnetic conductive frame in an embodiment of the present disclosure.
Figure 7:
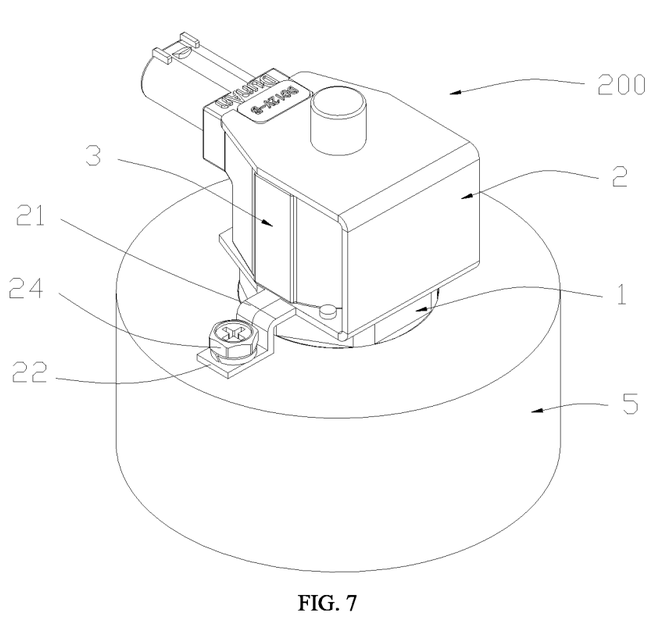
FIG. 7 is a schematic diagram of an electromagnetic valve assembly in an embodiment of the present disclosure.

In an embodiment, referring to FIG. 6 and FIG. 7, an end of the pin away from the magnetic conductive frame 2 may be bent to define as a bent portion 22, and the bent portion 22 is provided with a first through hole 23. The electromagnetic valve 100 may further include a connecting member 24, which may penetrate through the first through hole 23 and be connected to the mounting base 5. The connecting member 24 may be a bolt or a dowel, etc.

Alternatively, the bent portion 22 may abut against the mounting base 5. When the magnetic conductive frame 2 is assembled and mounted, the bent portion 22 of the pin may just abut against the mounting base 5, and the bent portion 22 and the mounting base 5 may cooperate with each other to reduce difficulty of assembly. When the bent portion 22 abuts against the mounting base 5, the mounting base 5 may play a certain supportive role for the magnetic conductive frame 2, and the assembly may be more stable. In other embodiments, a gap may exist between the bent portion 22 and the mounting base 5.

In an embodiment, referring to FIG. 1 to FIG. 4, the valve seat 1 may further include a clamping portion 12, which is provided proximal to the magnetic conductive frame 2, and a part of the clamping portion 12 may protrude from the mounting base 5 along an axial direction of the valve seat 1. The positioning member 21 is provided at an end of the magnetic conductive frame 2 proximal to the valve seat 1, and the part of the clamping portion 12 protruding from the mounting base 5 along the axial direction of the valve seat 1 may have the same height as the positioning member 21. The part of the clamping portion 12 protruding from the mounting base 5 may have the same height as the positioning member 21, so that the positioning member 21 may be exactly in contact with the mounting base 5 and is connected to the mounting base 5 after the assembly is completed, and the valve seat 1 may also abut against the magnetic conductive frame 2, reducing a height of the electromagnetic valve 100 and the mounting base 5 after the assembly and decreasing occupied space. Heights of a plurality of members may be adapted to match each other, allowing the assembly of the electromagnetic valve 100 and the mounting base 5 rapider and more aesthetically pleasing. In other embodiments, the height of the clamping portion 12 and the height of the positioning member 21 may be not limited, and the height of the clamping portion 12 may be not equal to the height of the positioning member 21.

Figure 4:
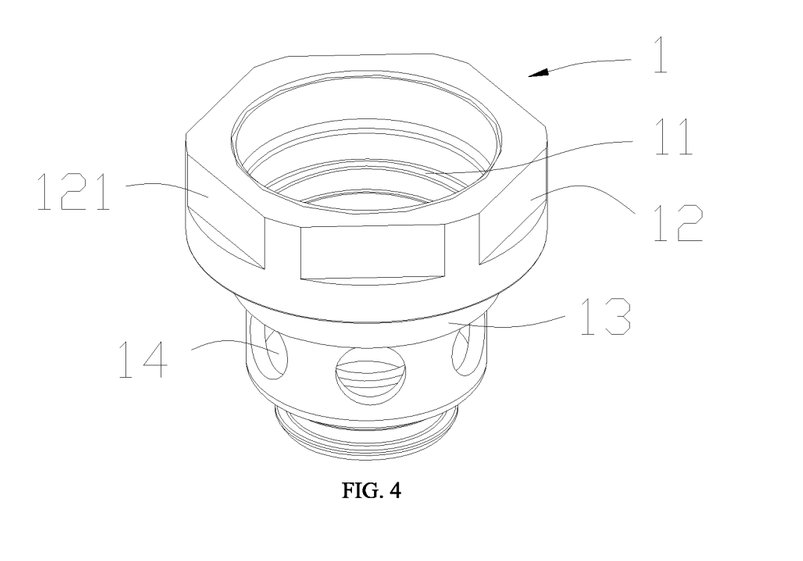
FIG. 4 is a schematic diagram of a valve seat in the present disclosure.

Alternatively, the clamping portion 12 is provided with at least two clamping planes 121, and an external mounting tool may cooperate with the clamping planes to realize a connection between the valve seat 1 and the mounting base 5 to be tightened, so as to improve the assembly efficiency.

Alternatively, referring to FIG. 4, a plurality of clamping planes 121, such as six clamping planes 121, are provided on the clamping portion 12 of the valve seat 1, and the plurality of clamping planes 121 are distributed equally circumferentially around the valve seat 1. In other embodiments, the number of clamping planes 121 may be not limited.

In an embodiment, alternatively, the positioning member 21 and the magnetic conductive frame 2 may be an integral construction, resulting in reducing assembly steps between the positioning member 21 and the magnetic conductive frame 2, and the integral construction may enable a connection between the positioning member 21 and the magnetic conductive frame 2 more stable. In other embodiments, the positioning member 21 and the magnetic conductive frame 2 may be split constructions.

The present disclosure further provides an electromagnetic valve assembly 200. Referring to FIG. 1 and FIG. 7, the electromagnetic valve assembly 200 includes a mounting base 5 and any one of the above electromagnetic valves, and the electromagnetic valve is mounted in the mounting base 5.

In an embodiment, the mounting base 5 is provided with a mounting portion 52 corresponding to the positioning member 21, and the positioning member 21 may cooperate with the mounting portion 52 to limit rotation of the magnetic conductive frame 2. Specifically, referring to FIG. 1 and FIG. 5, the mounting portion 52 may be a groove disposed on the mounting base 5, and the pin may be inserted into the groove correspondingly to rapidly complete the positioning of the orientation of the magnetic conductive frame 2 when assembling. In other embodiments, the number of the groove may be not limited. For example, a plurality of grooves may be disposed, and the pin may be inserted into a corresponding groove according to a desired orientation of the magnetic conductive frame 2. Referring to FIG. 1, the mounting portion 52 may also be a through hole disposed on the mounting base 5, and an end of the connecting member 24 may penetrate through the first through hole 23 of the bent portion 22 and be inserted into the through hole of the mounting base 5, realizing a limitation of the orientation of the magnetic conductive frame 2. The connecting member 24 may be a bolt or a dowel, etc. Alternatively, an end of the connecting member 24 proximal to the bent portion 22 may abut against the bent portion 22, realizing an axial limitation of the bent portion 22 and preventing the positioning member 21 from moving along an axial direction of the valve seat 1 and back towards the mounting base 5 and detaching from the mounting base 5.

In an embodiment, the clamping portion 12 and a connecting portion 13 may be sequentially provided along the axial direction of the valve seat 1 top-down. An outer side wall of the connecting portion 13 may be provided with a first threaded portion 131, the corresponding mounting base 5 may be provided with a second threaded portion, and the first threaded portion 131 may be connected to the second threaded portion to realize a rapid assembly of the valve seat 1 and the mounting base 5.

Figure 2:
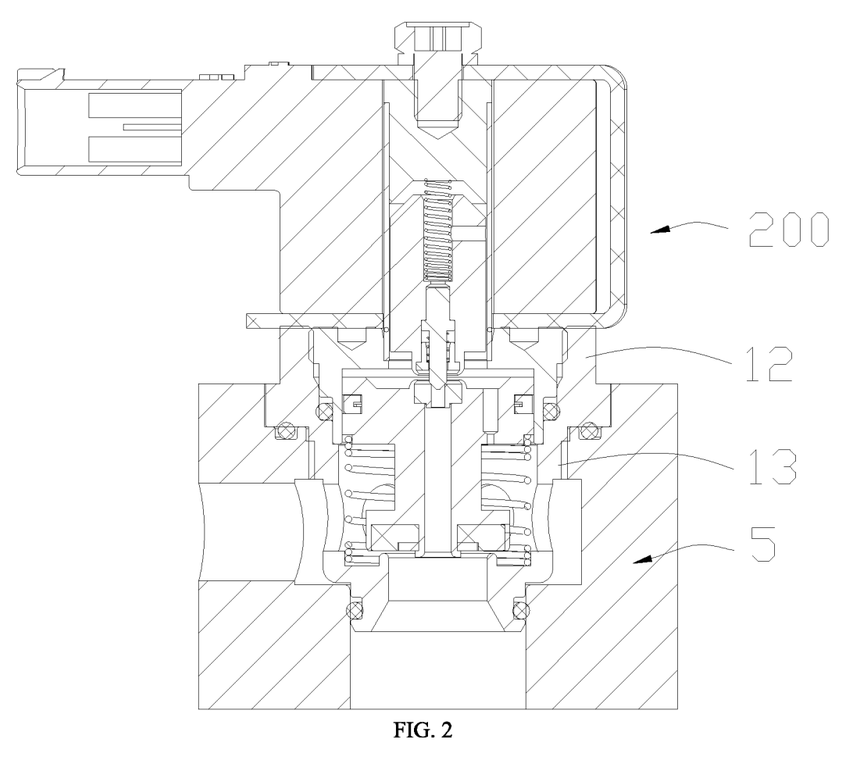
FIG. 2 is a schematic diagram of a longitudinal section of FIG. 1.
Figure 3:
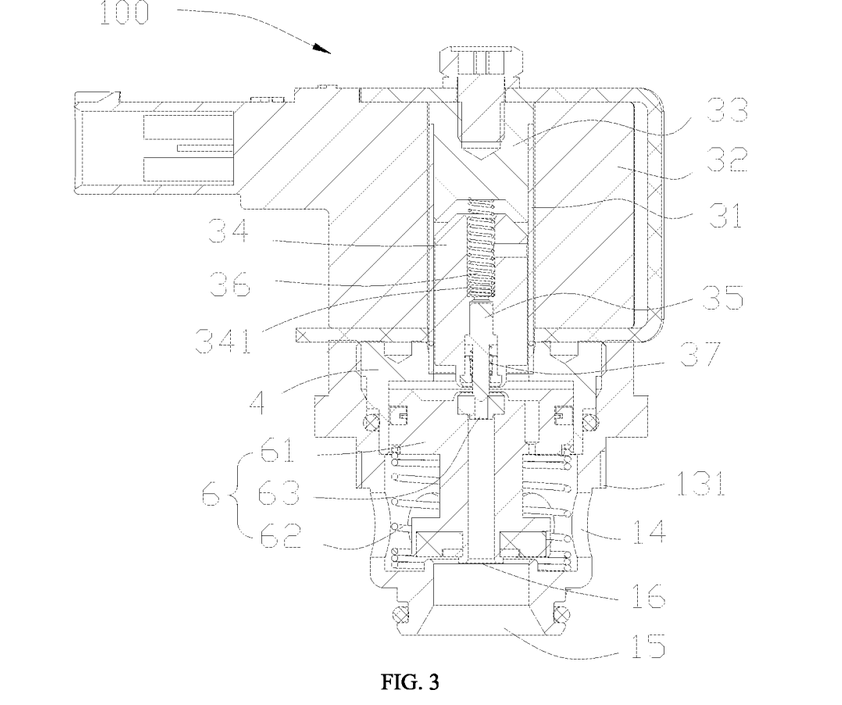
FIG. 3 is a cross-sectional diagram of an electromagnetic valve in the present disclosure.

In an embodiment, referring to FIG. 2 and FIG. 3, the valve body may further include a valve cover 4, the valve seat 1 is provided with a first cavity 11, an outer side wall of the valve cover 4 is sealingly connected to an inner wall side of the first cavity 11, and the valve cover 4 may have no relative sliding with the valve seat 1. The magnetic conductive frame 2 may be mounted on the valve seat 1 and the valve cover 4 and a lower end surface of the magnetic conductive frame 2 may abut against the valve seat 1 and the valve cover 4.

The valve seat 1 is provided with an inlet flow channel 14 and an outlet flow channel 15 which are connected to and in communication with a valve port 16 and the first cavity 11. Opening and closing of the valve port 16 may control communication and closure between the inlet flow channel 14 and the outlet flow channel 15.

In an embodiment, the electromagnetic valve may further include a blocking assembly 6, the valve seat 1 is provided with a valve port 16, and the blocking assembly 6 is disposed in the valve seat 1 and is capable of opening and closing the valve port 16 when the blocking assembly 6 is driven by the electromagnetic driving assembly 3.

In an embodiment, an end of the valve cover 4 away from the magnetic conductive frame 2 is provided with a second cavity configured for accommodating the blocking assembly 6, and an end of the blocking assembly 6 proximal to the magnetic conductive frame 2 may be sealingly and slidingly connected to a cavity wall of the second cavity.

In an embodiment, the blocking assembly 6 may include a blocking body 61 and a second elastic member 62, an end of the blocking body 61 may be accommodated in the second cavity, and another end of the blocking body 61 is configured for blocking the valve port 16. An end of the second elastic member 62 may abut against an end of the blocking body 61 proximal to the magnetic conductive frame 2, and another end of the second elastic member 62 may abut against an end of the first cavity 11 away from the magnetic conductive frame 2. The second elastic member 62 is configured to open the valve so that resilient recovery drives the blocking body 61 to move towards the magnetic conductive frame 2 for opening the valve port 16.

In an embodiment, the electromagnetic driving assembly 3 may include an electromagnetic unit and a valve needle unit. The electromagnetic unit may drive the valve needle 35 to move back towards the blocking body 61 to open the valve when the electromagnetic unit is energized. When the power is turned off, the blocking body 61 may move towards the valve port 16 until the blocking body 61 seals against the valve port 16 to close the valve port 16.

Specifically, an end of the blocking body 61 proximal to the valve needle 35 is provided with a pilot valve port 63, the valve needle 35 may be driven by the electromagnetic unit to open and close the pilot valve port 63. When the pilot valve port 63 is opened to relieve pressure, a pressure of a side of the blocking assembly 6 proximal to the valve needle 35 may be less than a pressure of a side of the blocking assembly 6 proximal to the valve port 16. When differential pressure force is sufficient, the blocking assembly 6 may move back towards the valve port 16, so that the valve port is opened. In an embodiment, the electromagnetic unit may include an electromagnetic coil 32, a stator 33 that is stationary with respect to the electromagnetic coil 32, and an actuator 34 that is movable along an axial direction of the valve seat 1. The electromagnetic coil 32 may be sheathed outside the stator 33 and the actuator 34. A first elastic member 36 is further provided between the stator 33 and the actuator 34, the actuator 34 is provided with a third cavity 341 penetrating through the actuator 34 along an axial direction, the first elastic member 36 may be at least partially movable in the third cavity 341, and the first elastic member 36 may resiliently recover to drive the valve needle unit to move towards the blocking body 61, so as to drive the blocking body 61 to move towards the valve port 16 to close the valve port 16. The electromagnetic coil 32 may be fixed in the magnetic conductive frame 2.

In an embodiment, the electromagnetic driving assembly may further include a sleeve 31, and an end of the sleeve 31 proximal to the valve seat 1 may extend out of the magnetic conductive frame 2 and be fixedly connected to the valve cover 4. The stator 33 may be fixed to an end of the sleeve 31 away from the valve seat 1, the actuator 34 may be movable inside the sleeve 31, and the electromagnetic coil 32 may be sheathed outside the sleeve 31.

The valve needle unit may include a valve needle 35 and an elastic member of the valve needle 35. The valve needle 35 may be movable in the third cavity 341, an end of the elastic member of the valve needle 35 may abut against an end of the valve needle 35 proximal to the stator 33, and another end of the elastic member of the valve needle 35 may abut against an end of the third cavity 341 proximal to the valve seat 1.

A process of opening valve of the electromagnetic valve 100 in the present disclosure may be as follows: the electromagnetic coil 32 is powered on, the actuator 34 moves towards the stator 33, and the actuator 34 overcomes elastic force of the first elastic member 36 and moves upward until the actuator 34 contacts the valve needle 35 and drives the valve needle 35 to move back towards the valve seat 1. At this moment, the actuator 34 needs to overcome force of the first elastic member 36 to move upward, a gap between the actuator 34 and the stator 33 is quite narrow, a suction force is much greater than that in initial stage of suction, the actuator 34 has a great kinetic energy, it is easy to realize opening valve, and a valve opening ability is much better than that of the conventional structure. Finally, the actuator 34 and the stator 33 are fully contacted, the valve needle 35 continues to move upward to an upper limitation under an action of the elastic member of the valve needle 35, a pressure of the pilot valve port 63 is relieved, an upper pressure of the blocking body 61 is less than a lower pressure of the blocking body 61, the blocking body 61 moves upward to fit with the valve cover 4, and the valve port 16 is fully open.

When the valve is closed, the electromagnetic coil 32 is powered off, the actuator 34 is not subject to a magnetic attraction of the stator 33, the actuator 34 drives the valve needle 35 to move downward under an action of the elastic member of the valve needle 35 to realize closing of the valve port 16.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

What is claimed is:

1. An electromagnetic valve, mounted on a mounting base, wherein the electromagnetic valve comprises:
   a valve body, at least comprising a valve seat, wherein the valve seat is mounted on the mounting base;
   a magnetic conductive frame fixed to the valve seat; and
   an electromagnetic driving assembly mounted in the magnetic conductive frame;
   wherein the magnetic conductive frame is provided with a positioning member, and the positioning member is capable of cooperating with the mounting base so as to restrict the electromagnetic driving assembly from rotating relative to the mounting base;
   the valve seat further comprises a clamping portion, which is provided proximal to the magnetic conductive frame, a part of the clamping portion protrudes from the mounting base along an axial direction of the valve seat, and the clamping portion is provided with at least two clamping planes; and
   the positioning member is provided at an end of the magnetic conductive frame proximal to the valve seat.

2. The electromagnetic valve of claim 1, wherein the positioning member comprises a pin located on the magnetic conductive frame, and the pin extends towards the mounting base.

3. The electromagnetic valve of claim 2, wherein the pin is in a shape of a L.

4. The electromagnetic valve of claim 2, wherein an end of the pin away from the magnetic conductive frame is bent to define as a bent portion, and the bent portion is provided with a first through hole; and the electromagnetic valve further comprises a connecting member, which penetrates through the first through hole and is connected to the mounting base.

5. The electromagnetic valve of claim 4, wherein the bent portion abuts against the mounting base.

6. The electromagnetic valve of claim 1, wherein the part of the clamping portion protruding from the mounting base along the axial direction of the valve seat has the same height as the positioning member.

7. The electromagnetic valve of claim 1, wherein the positioning member and the magnetic conductive frame are an integral structure.

8. The electromagnetic valve of claim 1, further comprising a blocking assembly, the valve seat is provided with a valve port, and the blocking assembly is disposed in the valve seat and is capable of opening and sealing the valve port when the blocking assembly is driven by the electromagnetic driving assembly.

9. An electromagnetic valve assembly, comprising the mounting base and the electromagnetic valve of claim 1, wherein at least a part of the electromagnetic valve is mounted in the mounting base.

10. The electromagnetic valve assembly of claim 9, wherein the mounting base is provided with a mounting portion corresponding to the positioning member, and the positioning member cooperates with the mounting portion to limit rotation of the magnetic conductive frame.

11. The electromagnetic valve assembly of claim 9, wherein the positioning member comprises a pin located on the magnetic conductive frame, and the pin extends towards the mounting base.

12. The electromagnetic valve assembly of claim 11, wherein the pin is in a shape of a L.

13. The electromagnetic valve assembly of claim 11, wherein an end of the pin away from the magnetic conductive frame is bent to define as a bent portion, and the bent portion is provided with a first through hole; and the electromagnetic valve further comprises a connecting member, which penetrates through the first through hole and is connected to the mounting base.

14. The electromagnetic valve assembly of claim 13, wherein the bent portion abuts against the mounting base.

15. The electromagnetic valve assembly of claim 9, wherein the part of the clamping portion protruding from the mounting base along the axial direction of the valve seat has the same height as the positioning member.

16. The electromagnetic valve assembly of claim 9, wherein the positioning member and the magnetic conductive frame are an integral structure.

17. The electromagnetic valve assembly of claim 9, further comprising a blocking assembly, the valve seat is provided with a valve port, and the blocking assembly is disposed in the valve seat and is capable of opening and sealing the valve port when the blocking assembly is driven by the electromagnetic driving assembly.

18. The electromagnetic valve assembly of claim 15, wherein the clamping portion and a connecting portion are sequentially provided along the axial direction of the valve seat, an outer side wall of the connecting portion is provided with a first threaded portion, the mounting base is provided with a second threaded portion, and the first threaded portion is connected to the second threaded portion.

19. The electromagnetic valve assembly of claim 17, wherein the valve body further comprises a valve cover, the valve seat is provided with a first cavity, an outer side wall of the valve cover is sealingly connected to an inner wall side of the first cavity, and the valve cover has no relative sliding with the valve seat; and the magnetic conductive frame is mounted on the valve seat and the valve cover, and a lower end surface of the magnetic conductive frame abuts against the valve seat and the valve cover.

20. The electromagnetic valve assembly of claim 19, wherein an end of the valve cover away from the magnetic conductive frame is provided with a second cavity configured for accommodating the blocking assembly, and an end of the blocking assembly proximal to the magnetic conductive frame is sealingly and slidingly connected to a cavity wall of the second cavity.

* * * * *